July 31, 1923.  1,463,593
J. ROSS
TRACTOR FRAME CONSTRUCTION
Filed April 17, 1922   2 Sheets-Sheet 1

Inventor:
James Ross
By Parker & Carter Attys

July 31, 1923.
J. ROSS
1,463,593
TRACTOR FRAME CONSTRUCTION
Filed April 17, 1922    2 Sheets-Sheet 2
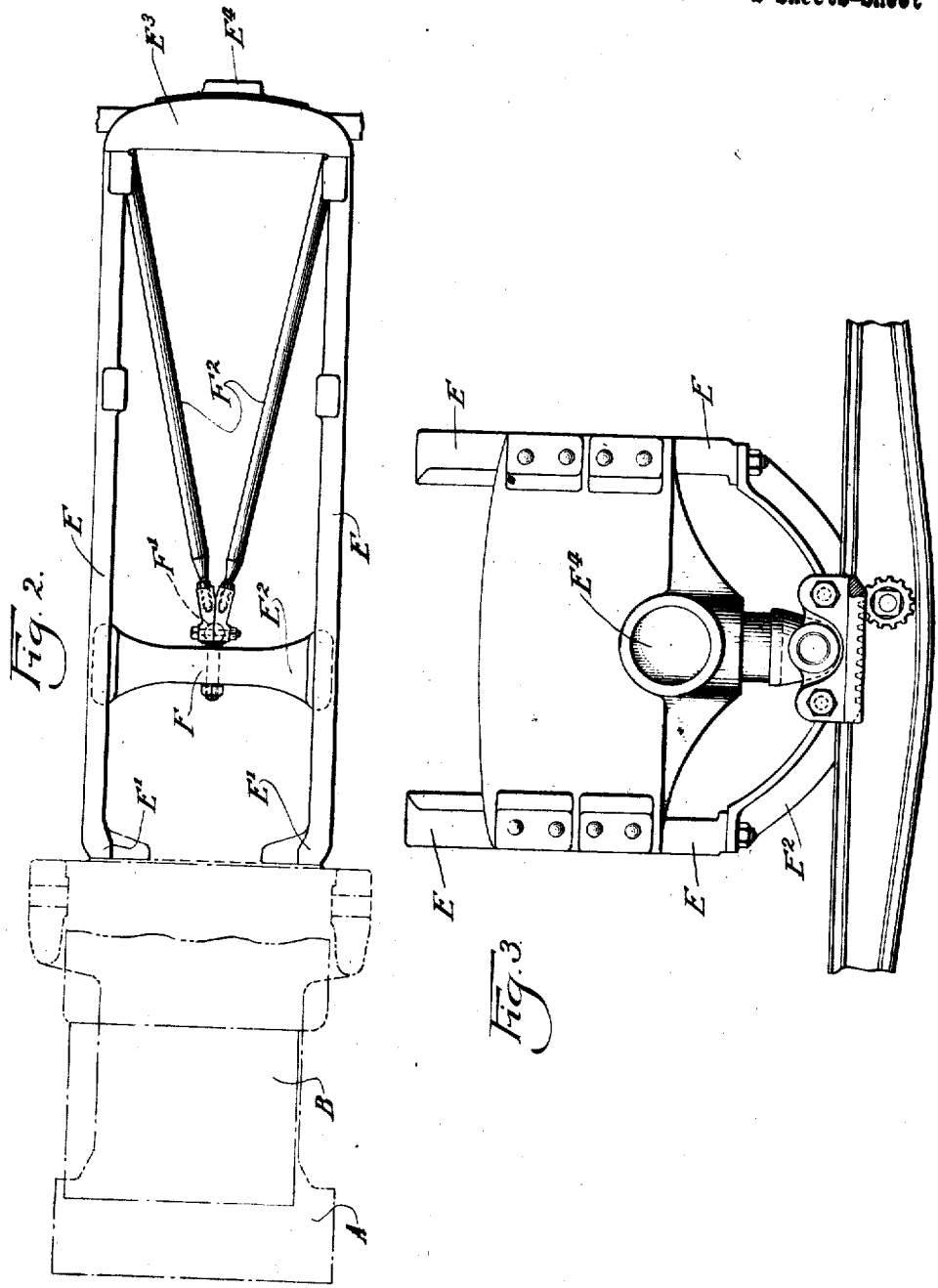
Inventor
James Ross
By Parker + Carter Attys.

Patented July 31, 1923.

1,463,593

UNITED STATES PATENT OFFICE.

JAMES ROSS, OF LAPORTE, INDIANA, ASSIGNOR TO ADVANCE-RUMELY COMPANY, OF LAPORTE, INDIANA, A CORPORATION OF INDIANA.

TRACTOR-FRAME CONSTRUCTION.

Application filed April 17, 1922. Serial No. 553,722.

*To all whom it may concern:*

Be it known that I, JAMES ROSS, a citizen of the United States, residing at Laporte, in the county of Laporte and State of Indiana, have invented a certain new and useful Improvement in Tractor-Frame Constructions, of which the following is a specification.

This invention relates to the main frame of an automotive vehicle and particularly to the main frame of a tractor. It has for one object to provide a compact and simple frame which can be inexpensively made and in which the essential structural elements of the engine are combined with the frame members to make the complete main frame of the vehicle. Other objects will appear from time to time throughout the specification and claims.

My invention is illustrated more or less diagrammatically in the accompanying drawings, wherein:

Figure 2 is a plan view of Figure 1;

Figure 3 is a front elevation of the frame.

Like parts are designated by like characters throughout.

Figure 1:
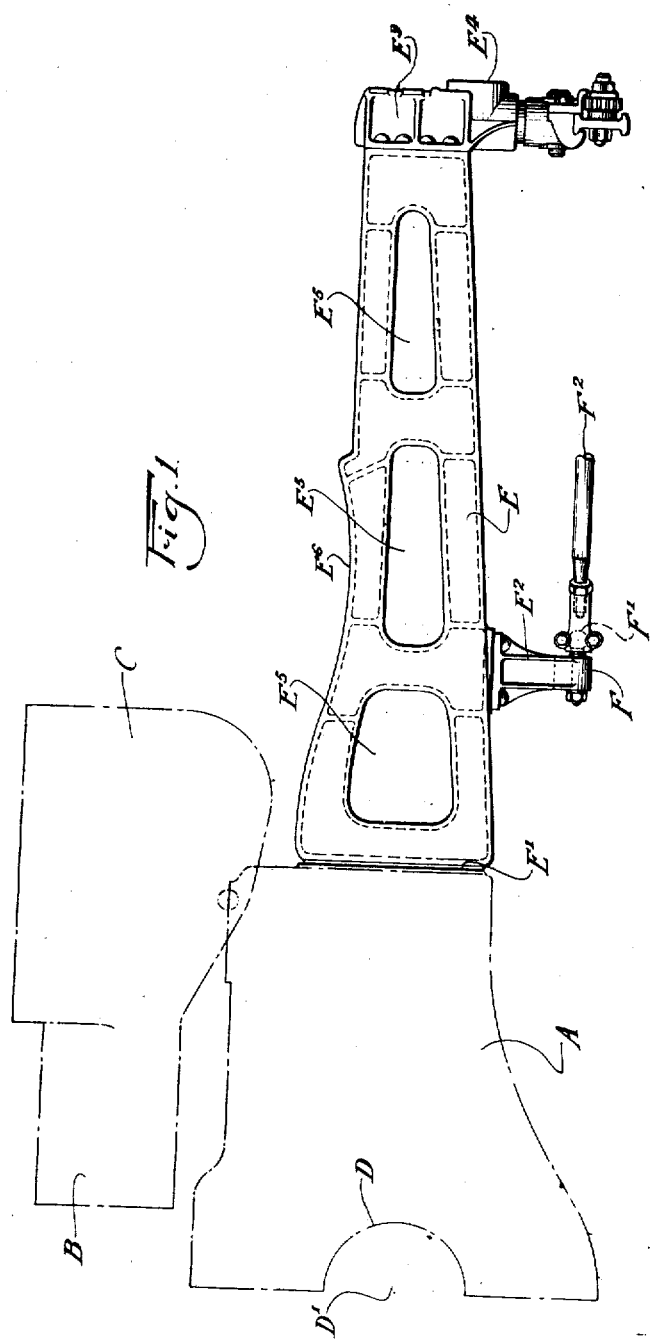
Figure 1 is a side elevation of the frame with parts omitted.

A is a part of the transmission case of a tractor. B is the cylinder block and C is the crank case of the engine. The transmission case is provided with a depression D in which the axle D' of the vehicle is positioned. The forward part of the frame is made up of the two side frame members E, E each of which is bolted or secured to the transmission case at one end as at E' E', and the side frame members are enlarged at their ends as shown in order to form a satisfactory base for the attachment to the transmission case. The side frame members are joined intermediate their ends by the frame support E² which serves also as a support for the front axle brace bracket which will be described later. At their forward end the side frame members are secured together by means of the front member casting E³ which is provided in its forward side with a circular depression or pocket E⁴.

The side frame members are formed as shown particularly in Figure 1 with openings E⁵ in their sides, the upper surface of which is rounded as at E⁶ to provide a fitted support for a fluid tank which forms part of the assembly. The member E² is perforated as at F and in the perforation F is mounted the universal joint connection F' to which are secured the front axle braces F². The front axle assembly is positioned below and secured to the forward frame member E³. The details of construction of this assembly are not specifically described as they form no part of the present invention. The front axle is braced and stayed by means of the front axle braces F².

Although I have shown an operative invention, still it will be obvious that many changes in size, shape and arrangement of parts may be made without departing materially from the spirit of my invention, and I wish therefore that my showing be taken as in a sense diagrammatic.

The use and operation of my invention are as follows:

The parts are assembled as shown, the frame being secured to the transmission case which is assembled as a unit. The running gear of the vehicle is then put in place and the engine and other parts of the engine assembly are positioned upon the vehicle frame. By this means by the construction shown the frame is materially lightened and simplified and the essential part of the engine assembly, namely, the transmission case is made to serve a dual purpose since it serves both as a transmission case and as an element in the vehicle frame.

I claim:

1. In a wheeled automotive vehicle a frame including in combination the transmission case of the driving engine and a plurality of frame members attached directly thereto said frame members forming the sole forward support of the vehicle frame and engine assembly in combination with a pair of axles, one adapted directly to support said transmission case and the other to support said frame members, said frame members forming the sole forward support of the vehicle frame and engine assembly, the engine being separate from the transmission case.

2. A vehicle frame including in combination a transmission case and a plurality of frame members attached directly thereto, said frame members forming the sole forward support of the vehicle frame and engine assembly said frame members shaped along their upper edge to conform to the shape of the parts of the engine assembly.

3. A vehicle frame including in combination a transmission case and a plurality of frame members attached directly thereto, said frame members forming the sole forward support of the vehicle frame and engine assembly said frame members provided with laterally extending reinforcing flanges and with openings.

4. A vehicle frame including in combination a unit transmission case and a plurality of frame members attached thereto, said frame members forming the sole forward portion of the vehicle frame, and an engine mounted upon said transmission case and separate from said frame members.

Signed at Laporte county of Laporte and State of Indiana, this 11th day of April, 1922.

JAMES ROSS.